April 28, 1959     E. S. BARCLAY     2,884,152
VENTED BOTTLE CLOSURE

Filed Aug. 26, 1953

INVENTOR.
EUGENE S. BARCLAY
BY
Raymond Underwood
ATTORNEY

2,884,152

VENTED BOTTLE CLOSURE

Eugene S. Barclay, Newtown Square, Pa., assignor to Merck & Co., Inc., Rahway, N.J., a corporation of New Jersey Application August 26, 1953, Serial No. 376,572

3 Claims. (Cl. 215—56)

This invention relates to bottle closures and more particularly to an article of this kind embodying filtering material.

The closure of the invention is intended to be used, for example, with bottles used in bacteriology for the growth of microorganisms and moulds. The so-called Blake bottle is representative of the type to which the closure of the invention may be applied.

A problem in culturing microorganisms for various purposes has been a device to permit the free exchange of air between the inside and outside of the bottle necessary to permit the growth of most microorganisms and at the same time prevent the entrance of foreign bacteria that would contaminate the culture. Many different materials have been used in an attempt to provide a convenient, satisfactory, reuseable and inexpensive closure and of all that have been proposed, a cotton wad is still the most satisfactory and commonly used. The disadvantages of a cotton plug are numerous, among which may be stated the fact that most cotton contains an oil which is injurious to the culture of some microorganisms; the cotton gets wet and microorganisms go through it when wet; the lint from cotton may fall into the culture medium and interfere with determinations of opacity or simply act as a foreign body and adulterate the culture. Indeed, the inhibitions of the culture to the oils of cotton have necessitated in certain work the use of simple closures or loose fitting caps of metal or glass which allow a high percentage of contamination, but it has been necessary to take this loss to accomplish the purpose.

This invention is of particular value because it eliminates many of these difficulties. There is no lint to fall into the medium. The stainless steel filter can be cleaned chemically and as stainless steel is non-injurious to microorganisms, no foreign contamination is possible. The disk is sufficiently thin such that if by chance it became wet, even with the culture medium, it would dry out before contamination could result from microorganisms, particularly moulds, growing through the porous material. The design of the closure containing the metal disk is such that it is convenient to handle and is practical for handling in the usual bacteriological procedures and can be used over and over again. It is sufficiently dense that it will serve to keep out all microorganisms and has a second advantage over cotton in that it will allow the free exchange of air and at the same time help prevent the evaporation of the liquid in the container, which happens so rapidly when a cotton plug is used.

In the drawings showing a representative embodiment of the invention:

Figure 1:
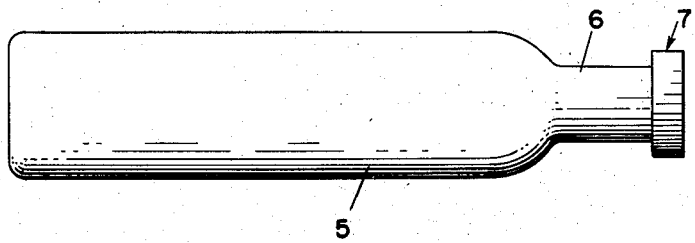
Figure 1 is a side elevational view of a culture bottle to which the closure of the invention has been applied.
Figure 2:
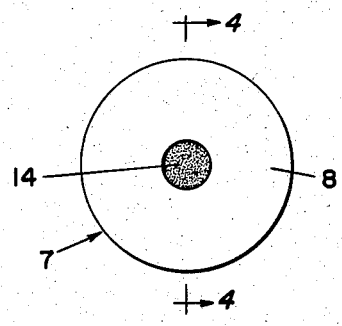
Figure 2 is a view of the top side of the closure.
Figure 3:
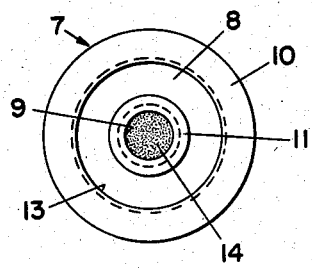
Figure 3 is a view of the underside of the closure.
Figure 4:
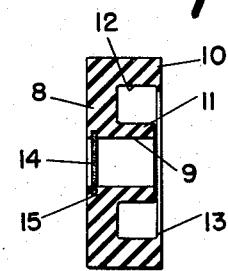
Figure 4 is a cross sectional view on the line 4—4 of Figure 2.

The bottle 5 of Figure 1 is intended to be representative of any bottle which may be used for the growth of microorganisms. The ordinary Blake bottle which is here shown for illustrative purposes, has four flat sides and is generally oblong in cross section and rests on one of its larger sides. It is elongated relative to its cross sectional dimensions and is provided with a neck 6 which has an external flange at its open end.

The closure 7 of the invention is applied to the open end of the neck 6. It includes a disk 8 having an axial bore 9 therethrough. It has a peripheral, annular, depending flange 10 and an inwardly or centrally located annular, depending flange 11. The flanges 10 and 11 form between them an annular groove 12 to receive the neck of the bottle.

It will therefore be observed that the closure 7 serves both as a cap over the bottle and as a stopper which enters the neck of the bottle. Thus, the peripheral flange 10 fits tightly over the outside surfaces of the neck of the bottle and the inner flange 11 fits frictionally within the opening to the bottle to thereby form a continuous contacting surface at the open end of the bottle to establish an air-tight seal.

To further increase this frictional engagement, the flange 10 may be provided with an inturned or reentrant bead 13 which engages behind the external flange which is ordinarily present at the end of the neck of the conventional Blake bottle. The interlocking effect of this bead serves to further resist accidental displacement of the closure 7 from the bottle. However, it is not necessary that this bead 13 be present. Moreover, it is not absolutely necessary that both the flanges 10 and 11 be present as only one of them may be sufficient. It is preferred that both the flanges 10 and 11 be present to positively assure an air-tight seal on the bottle so that the closure serves solely either as a cap or as a stopper.

It is contemplated that the closure 7 will be made of any resilient material such as natural rubber or synthetic rubber-like materials. This makes it possible to readily apply and dislodge the closure from the bottle, and because of its resilient nature it will firmly engage the bottle with an air-tight seal.

It has been mentioned that the closure has a bore 9 there-through. In accordance with the invention a filter element 14 is disposed transversely of this bore. At its peripheral edge it has a sealing engagement with the wall of the bore 9. To accomplish this, as here shown, this filter 14 is of disk shape of larger diameter than the diameter of the bore 9 and it is received within an internal groove 15 of the bore 9. It is thereby held in place by the gripping action of the closure itself. Because of the resilient nature of the closure, it is readily possible to remove and replace the filter element 14 when it is desired to sterilize the entire closure.

The filter disk 14 consists of particles which have been fused together so as to provide a solid, dense, but porous body. The particles making up the filter are generally of stainless steel. It is porous enough to permit the passageway of gases but is sufficiently dense to prevent the passage of microorganisms. A suitable one is that made by the Micro-Metallic Corp.

In accordance with the invention it has been found that the size of the filter element 14 should fall within certain limits in order to make sure, on the one hand, that it is sufficiently porous to permit the entrance of a required amount of oxygen and escape of gases, and on the other hand, that it is sufficiently effective in its filtering action to completely prevent the entrance of contaminating microorganisms. The filter disk which has been found to be most satisfactory for the conventional Blake bottle presents an exposed area within the bore 9 of about 3/8 inch in diameter. That is, the bore 9 is approximately 3/8 inch in diameter and the filter disk 14 must be slightly larger so as to fit within the groove 15.

Thus, the filter disk may itself be about ½ inch in diameter. It is preferably on the order of 1/32 inch in thickness.

It is to be understood, however, that the invention is not limited to these preferred dimensions inasmuch as the exposed portion of the filter, that is, the diameter of the bore 9, may be on the order of only ¼ inch, and on the other hand may be as large as ⅝ inch. It may be only about 1/100 inch in thickness, but on the other hand may be ⅛ inch in thickness.

Because of the simplified construction of the rubber-like portions of the closure and of the filter element itself, they may be readily sterilized by ordinary autoclaving or chemicals. After the bottle has been filled with the culture medium and inoculated, all that is required is to apply the assembled closure over the neck. It is then assured that sufficient oxygen will enter, that generated gases will escape, and that no contaminating microorganisms will enter. There is no need to exercise any care to obtain the correct filter density, such as is required if a cotton wadding is used.

What is claimed is:

1. A bottle closure comprising a body having at least one generally cylindrical flange which frictionally engages a surface at the neck of a bottle to form an airtight seal therewith, said closure having an axial bore therethrough to provide a communication between the inside and outside of the bottle, and a filter element disposed transversely of said bore and having its peripheral edge secured in an airtight sealing engagement with the wall of the bore, said filter element being a solid, dense body of fused particles having a porosity which continuously will pass gases therethrough but which will prevent the passage of microorganisms, said filter element having a thickness of from 1/100 to ⅛ of an inch.

2. A bottle closure, according to claim 1, in which the filter element has a thickness on the order of 1/32 of an inch.

3. A bottle closure, according to claim 1, in which said body includes two spaced flanges to frictionally engage the internal surface and the external surface of the neck of the bottle.

References Cited in the file of this patent

UNITED STATES PATENTS

| | | |
|---|---|---|
| 2,186,888 | Tullar et al. | Jan. 9, 1940 |
| 2,186,908 | Page et al. | Jan. 9, 1940 |
| 2,191,447 | Beardsley | Feb. 27, 1940 |
| 2,298,938 | Griffin et al. | Oct. 13, 1942 |
| 2,323,146 | Manney | June 29, 1943 |
| 2,393,578 | Waite | Jan. 22, 1946 |